United States Patent [19]

Kobayashi et al.

[11] Patent Number: 4,942,385

[45] Date of Patent: Jul. 17, 1990

[54] PHOTOELECTRIC INTRUSION DETECTOR

[75] Inventors: Shinji Kobayashi, Tokyo; Koichi Takada, Kanagawa; Kazuo Watanabe, Kanagawa; Motoharu Mitsuse, Kanagawa, all of Japan

[73] Assignee: Hochiki Corporation, Tokyo, Japan

[21] Appl. No.: 288,691

[22] Filed: Dec. 22, 1988

[30] Foreign Application Priority Data

Dec. 24, 1987 [JP] Japan .......................... 62-196374[U]
Jul. 28, 1988 [JP] Japan ............................... 63-189179

[51] Int. Cl.[5] ............................................... G05B 13/18

[52] U.S. Cl. .................................... 340/556; 250/221; 250/340

[58] Field of Search ............... 340/556, 557, 555, 567, 340/566; 250/340, 395, 371, 221

[56] References Cited

U.S. PATENT DOCUMENTS 3,579,220 5/1971 Stevenson, Jr. ..................... 340/566
3,752,978 8/1973 Kahl, Jr. et al. .................... 340/556
3,766,539 10/1973 Bradshaw et al. .................. 340/567

*Primary Examiner*—Glen R. Swann, III
*Attorney, Agent, or Firm*—Michael N. Meller

[57] ABSTRACT

A photoelectric intrusion detector for detecting the interruption by an intruder of a monitoring beam of optical radiation such as an infrared radiation includes circuitry for preventing the generation of a false alarm when the optical beam is attenuated during its propagation through space due to fog or the like. This false alarm preventing circuitry is designed so that when the attenuation of a beam of optical radiation during its propagation through space is increased due to the occurrence of fog in cloudy weather, the occurrence of a false alarm due to the attenuation of the pulsed light in cloudy weather is prevented by decreasing a comparator reference value to follow the decrease in the level of a light receiving signal, correcting the gain of AGC amplification to maintain constant the level of a received light signal or correcting the level of a received light signal which follows a received light initial value.

4 Claims, 6 Drawing Sheets

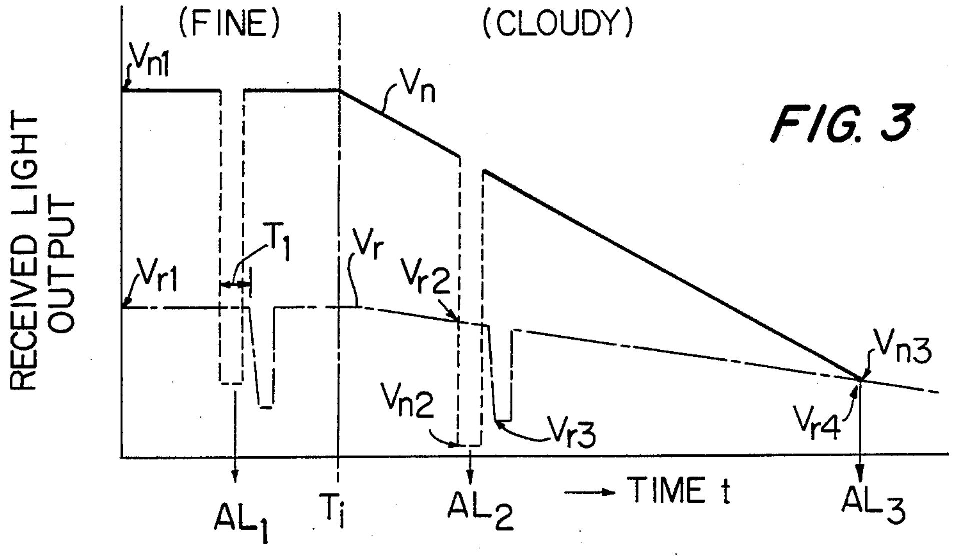
FIG. 3
FIG. 6
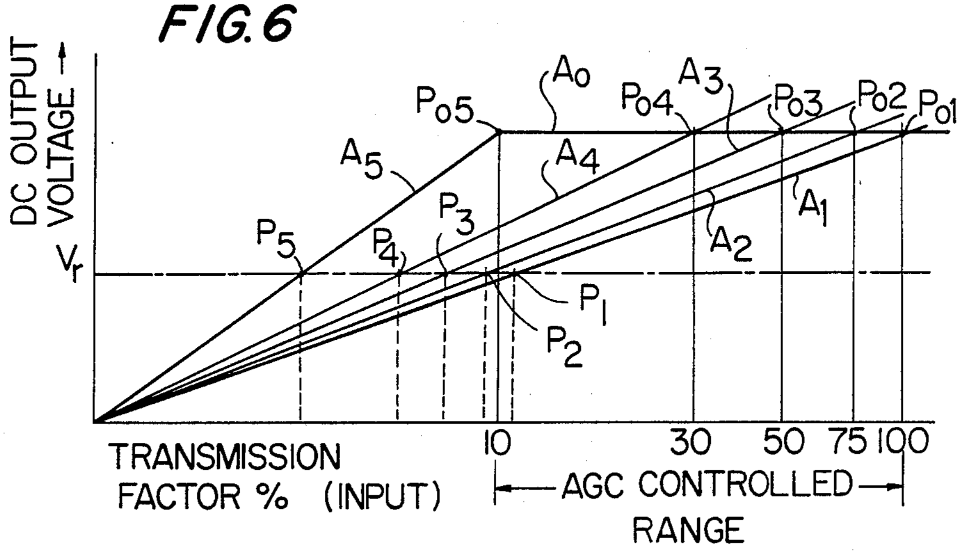

PHOTOELECTRIC INTRUSION DETECTOR

BACKGROUND OF THE INVENTION

The present invention relates to a photoelectric intrusion detector which detects interruption of a beam of optical radiation, e.g., infrared radiation, by an intruder to generate an alarm output.

Systems for detecting interruption of a beam of infrared radiation to give an alarm indicating the presence of an intruder are known in the art as shown in U.S. Pat. No. 3,752,978 to W. G. Kahl, Jr, et al or U.S. Pat. No. 4,516,115 to R. A. Frigon et al.

However, the conventional intrusion detectors have been disadvantageous in that while the outdoor use of the detector in a clear air condition such as fine weather does not greatly attenuate the arriving pulsed light from a light emitting unit during its propagation through space, thus ensuring a received light level of a sufficient light intensity at a light receiving unit, the occurrence of fog, rainfall or the like increases the attenuation of the arriving pulsed light during its propagation through space so that the received light level is decreased and the resulting input voltage to a level comparator within the receiving-end unit becomes lower than a predetermined reference voltage, thereby giving rise to the danger of issuing a false alarm.

Although the occurrence of such a false alarm due to fog or rainfall in cloudy weather can be prevented by increasing the intensity of the pulsed light from the light emitting unit, there is of course a limitation to the light emission power of an infrared light emitting diode of the type generally used in the light emitting unit. Therefore, if the established warning distance between the transmitting and receiving units is increased, the attenuation of the pulsed light reaches to a level which cannot be ignored, thereby tending to cause a false alarm in cloudy weather and thus there is a restriction that the established warning distance cannot be increased considerably.

SUMMARY OF THE INVENTION

The present invention has been made in view of the foregoing deficiencies in the prior art and it is the primary object of the invention to provide a photoelectric intrusion detector which is designed to prevent as far as possible the occurrence of any false alarm due to the attenuation of a beam of optical radiation during its propagation through space in cloudy weather accompanied with the occurrence of fog or the like.

To accomplish the above object, in accordance with one aspect of the invention there is provided a photoelectric intrusion detector including light sensitive means which receives the pulsed light projected from a separately arranged light emitting unit at a place remote therefrom to generate a corresponding electric signal; first comparison means for comparing the electric signal with a separately applied reference voltage to remove from the electric signal the noise component which is lower than the reference voltage; circuit means for receiving an output from the first comparison means to generate an output signal having a DC level corresponding to the received output; second comparison means for comparing the DC level signal generated from the circuit means with a predetermined threshold value to generate an output when the DC level is lower than the threshold value; alarm signal generating means for generating an alarm output when the output of the second comparison means lasts over a predetermined storage time; and reference voltage generating means for producing a voltage output varying in response to variations in the output of the light sensitive means with a predetermined delay time exceeding the storage time of the alarm signal generating means so as to apply said voltage output to the first comparison means as said reference voltage.

When fog occurs in cloudy weather, the received light signal level is attenuated and also the level of noise included in the received light signal is attenuated. With the photoelectric intrusion detector of the invention constructed as above described, the reference voltage of the first comparison means for removing the noise component is decreased in response to decrease in the received light signal level with a predetermined delay time. When this occurs, even if the received light signal is decreased due to fog or rain, the comparison voltage level for removing the noise component is decreased correspondingly so that in the steady-state monitoring condition the received light pulse (comparator output) from which the noise has been positively removed is obtained stably. Therefore, even if the attenuation of the pulsed light is increased in cloudy weather, there is no danger of causing any false alarm.

On the other hand, the interruption of the beam of infrared radiation by the passage of an intruder is effected at a higher speed than decrease in the light receiving signal level due to fog or rain and the interruption is positively detected in accordance with the difference in rate of decreasing change between the two, thereby leading to the generation of an alarm signal. In other words, since the reference voltage decreases to follow the signal level after the time delay longer than the storage time of the alarm signal generating means, in response to a rapid decrease in the light receiving level due to the passage of an intruder, the second comparison means immediately generates an output and the duration time of this output reaches a time sufficient for the alarm signal generating means to generate an alarm signal before the reference voltage decreases due to the decrease in the light receiving level, thereby positively giving an alarm.

Also, in accordance with another aspect of the invention there is provided a photoelectric intrusion detector including light sensitive means which receives the pulsed light projected from a separately arranged light emitting unit at a place remote therefrom to generate a corresponding electric signal; circuit means for receiving the electric signal generated from the light sensitive means to generate an output signal having a DC level corresponding to the electric signal; comparison means for comparing the DC level signal generated from the circuit means with a separately applied reference voltage to generate an output when the DC level is lower than the reference voltage; alarm signal generating means for generating an alarm output when the output of the comparison means lasts over a predetermined storage time; and reference voltage generating means for producing a voltage output varying in response to variations in the output of the light sensitive means with a predetermined delay time exceeding the storage time of the alarm signal generating means so as to apply said voltage output to the comparison means as said reference voltage. In the photoelectric intrusion detector of the invention having this construction, the reference voltage of the comparison means for performing level comparison of the received light signal level itself is decreased in response to decrease in the received light signal level with a predetermined delay time.

Further, in accordance with still another aspect of the invention there is provided a photoelectric intrusion detector including light sensitive means which receives the pulsed light projected from a separately arranged light emitting unit at a place remote therefrom to generate a corresponding electric signal; automatic gain control amplifying means for amplifying the electric signal generated from the light sensitive means with a gain corresponding to a separately applied AGC control voltage; circuit means for receiving an amplified output of the automatic gain control amplifying means to generate an output signal having a DC level corresponding to the amplified output; comparison means for comparing the DC level signal generated from the circuit means with a reference voltage to generate an output when the DC level is lower than the reference voltage; alarm signal generating means for generating an alarm output when the output of the comparison means lasts over a predetermined storage time; and delay circuit means for supplying the DC level signal from the circuit means as the AGC control signal to the automatic gain control amplifying means with a predetermined delay time exceeding the storage time of the alarm signal generating means, whereby the automatic gain control is performed in such a manner that the input to the comparison means is maintained at a constant level with a given time delay with respect to variations in the light receiving signal level within the range of automatic gain control where the received light signal level of the light sensitive means is higher than a given level.

In the case of the photoelectric intrusion detector constructed as described above, when the received light signal level is decreased, the received light signal level is maintained constant by the AGC amplification with a given time delay so that even if the attenuation of the pulsed light is increased in cloudy weather, this takes the form of a relatively slowly varying decrease and no false alarm is caused. On the other hand, since the AGC control of the received light signal level is performed by introducing a delay time exceeding the storage time of the alarm signal generating means, when the beam is interrupted by the passage of an intruder, an alarm signal is positively generated before the AGC control voltage is corrected.

Further, in accordance with still another aspect of the invention there is provided a photoelectric intrusion detector including light sensitive means which receives the pulsed light projected from a separately arranged light emitting unit at a place remote therefrom to generate a corresponding electric signal; circuit means for receiving the electric signal generated from the light sensitive means to generate an output signal having a DC level corresponding to the electric signal; memory means for storing as an initial value the DC level signal generated from the circuit means at the time of connection to a power source; correction factor alteration means for comparing a value of the DC level signal generated from the circuit means with the initial value held in the memory means at a predetermined constant period so that when there is a difference between the two values, a correction factor output varying in accordance with the difference is generated; operation means for performing an operation on the correction factor output from the correction factor alteration means and the DC level signal generated from the circuit means to correct the DC level signal to follow the stored initial value with a given time delay; comparison means for comparing the corrected DC level signal generated from the operator means with a predetermined reference voltage to generate an output when the DC level of the corrected DC level signal is lower than the reference voltage; and alarm signal generating means for generating an alarm signal when the output of the comparison means lasts over a predetermined storage time shorter than the constant period.

In this case, due to the fact that the received light signal level is periodically corrected to follow the initial value of the received light signal level at the time of connection to the power source, even if the attenuation of the pulsed light increases in cloudy weather, this is a relatively slowly varying decrease and therefore no false alarm is generated. Also, as regards the correction of the received light signal level, the correction is effected after the expiration of the delay time exceeding the storage time of the alarm signal generating means so that when the pulsed light is interrupted by the passage of a person, an alarm is issued positively prior to the correction of the received light signal level.

Thus, in accordance with the invention, in view of the fact that when the attenuation of a pulsed light during its propagation through space is increased due to the occurrence of fog or the like in cloudy weather, the occurrence of any false alarm due to the attenuation of the pulsed light in cloudy weather is prevented positively by virtue of decrease in the comparator reference value in response to decrease in the received light signal level, correction of the gain of AGC amplification for maintaining the received light signal level constant or correction of the received light signal level to follow the received light initial value.

The above and other objects and advantages of the invention will be more readily understood from the following description of its preferred embodiments taken in conjunction with the accompanying drawings.

BRIEF DESCRIPTION OF THE DRAWINGS

FIG. 3 is a graph showing the relation in time between the received light output and the reference voltage in the embodiment of FIG. 1.

FIG. 6 is a diagram for explaining the AGC characteristic of the embodiment shown in FIG. 5.

DESCRIPTION OF THE PREFERRED EMBODIMENTS

Figure 1:
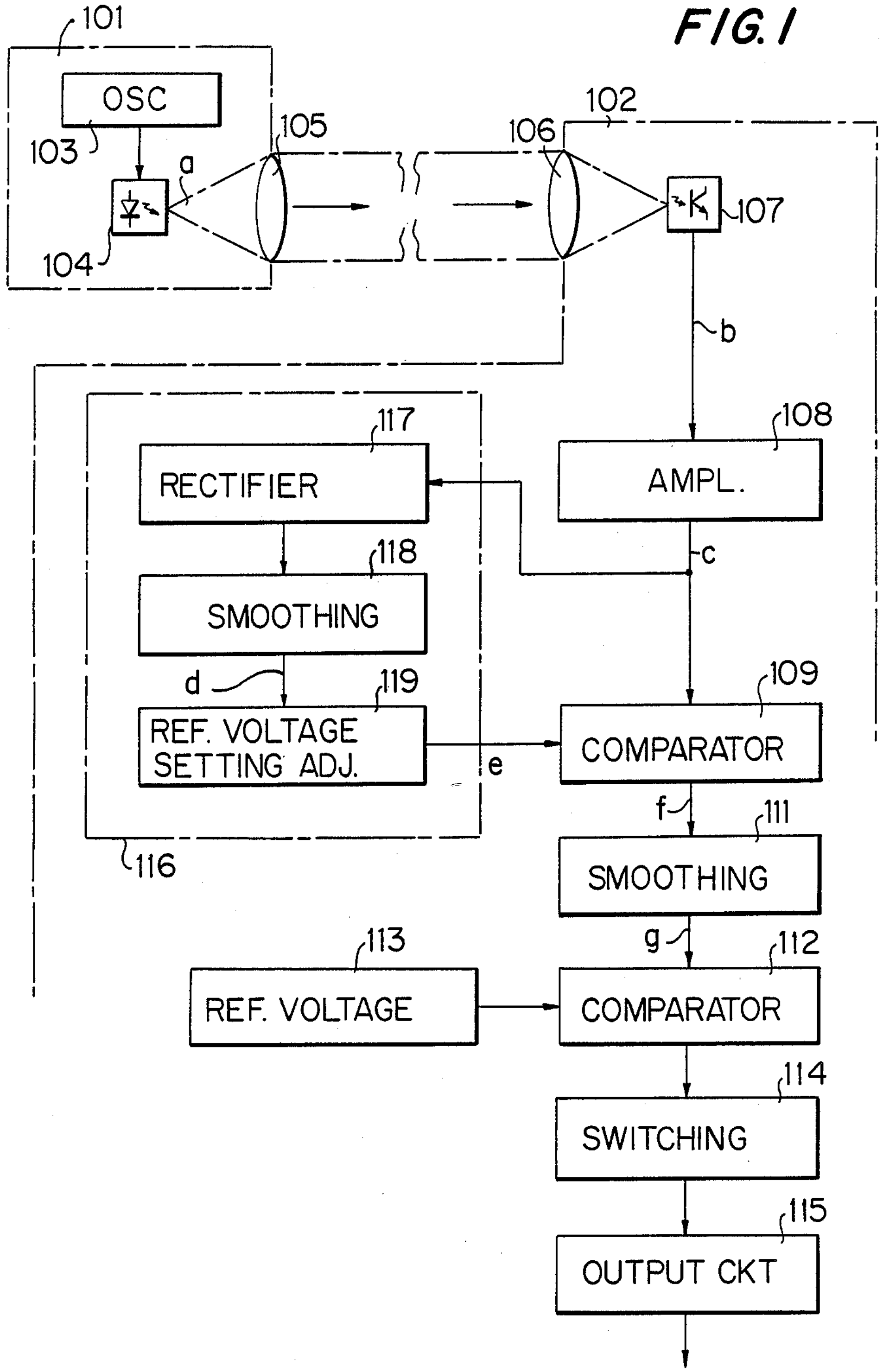
FIG. 1 is a circuit block diagram showing an embodiment of the present invention.

Referring to FIG. 1 showing a circuit block diagram for a first embodiment of the invention, numeral 101 designates a light emitting unit, and 102 a light receiving unit. After their optical axes have been aligned, the two units are separately arranged apart by a given warning distance.

The light emitting unit 101 includes an oscillator circuit 103 that output light emission drive pulses to an infrared light emitting element 104 comprising, for example, a light emitting diode, so as to intermittently drive it for light emission and the resulting light emission pulses from the infrared light emitting element 104 are collimated into a collimated beam of light by means of a lens (or a condensing mirror) 105, thereby projecting it to the light receiving unit 102. In this case, the frequency of the pulsed light from the light emitting unit 101 is generally selected to the about 500 Hz so as to avoid the effect of any disturbing noise light due to a fluorescent lamp or the like.

The light receiving unit 102 includes a lens 106 and a light sensitive element (photoelectric conversion element) 107 forming a light receiving section, so that the pulsed light emitted from the light emitting unit 101 is condensed through the lens 106 onto the light sensitive element 107 which in turn converts it to an electric signal. Of course, a condensing mirror may be used in place of the lens 106.

The weak received light signal generated from the light sensitive element 107 is amplified by an amplifier circuit 108 and applied to a fir$t level comparator 109. A comparator reference voltage for the first comparator 109 is applied from a reference voltage generating circuit 116.

The reference voltage generating circuit 116 includes a rectifier circuit 117, a smoothing circuit 118 and a reference voltage setting adjuster 119. More specifically, the light receiving signal amplified by the amplifier circuit 108 is rectified by the rectifier circuit 117 and converted to a DC signal corresponding to the level of the amplified light receiving signal by the smoothing circuit 118 having a given time constant (delay time $T_1$). The smoothed output from the smoothing circuit 118 is divided with, for example, a suitable voltage dividing ratio by the reference voltage setting adjuster 119, thereby applying the resulting voltage as the reference voltage to the comparator 109. As a result, the reference voltage applied to the comparator 109 from the reference voltage generating circuit 116 is varied in correspondence to the output level of the amplifier circuit 108.

The noise component of a signal level lower than the reference voltage is removed from the output signal of the amplifier circuit 108 so that the received light signal is generated as a noiseless pulse signal from the comparator 109. The output pulses from the comparator 109 are smoothed out by another smoothing circuit 111 so that the output pulses are converted to a DC level signal and applied to a second comparator 112. A second reference voltage serving as a given threshold value is fixedly set for the second comparator 112 by another reference voltage generating circuit 113 so that when the output level of the smoothing circuit 111 becomes lower than the second reference voltage, the comparator 112 generates an output. The output of the comparator 112 is applied to a switching circuit 114. When the output of the comparator 112 is applied continuously over a given storage time $T_2$ preset for the purpose of preventing any false alarm due to a passing small animal or a leaf falling from a tree, the switching circuit 114 comes into operation so that an alarm signal is sent through an output circuit 115 to an alarm receiving board or the like (not shown), thereby giving an alarm.

It is to be noted that the value of the time constant (delay time $T_1$) of the smoothing circuit 118 included in the reference voltage generating circuit 116, is selected longer than the storage time $T_2$ of the switching circuit 114 so that when the pulsed light transmitted from the light emitting unit 101 to the light receiving unit 102 is interrupted by an intruder, the response or follow-up delay time of the reference voltage with respect to decrease in the output level of the amplifier circuit 108 is sufficiently long and therefore the interruption of the pulsed light by the intruder can be detected positively.

Figure 2:
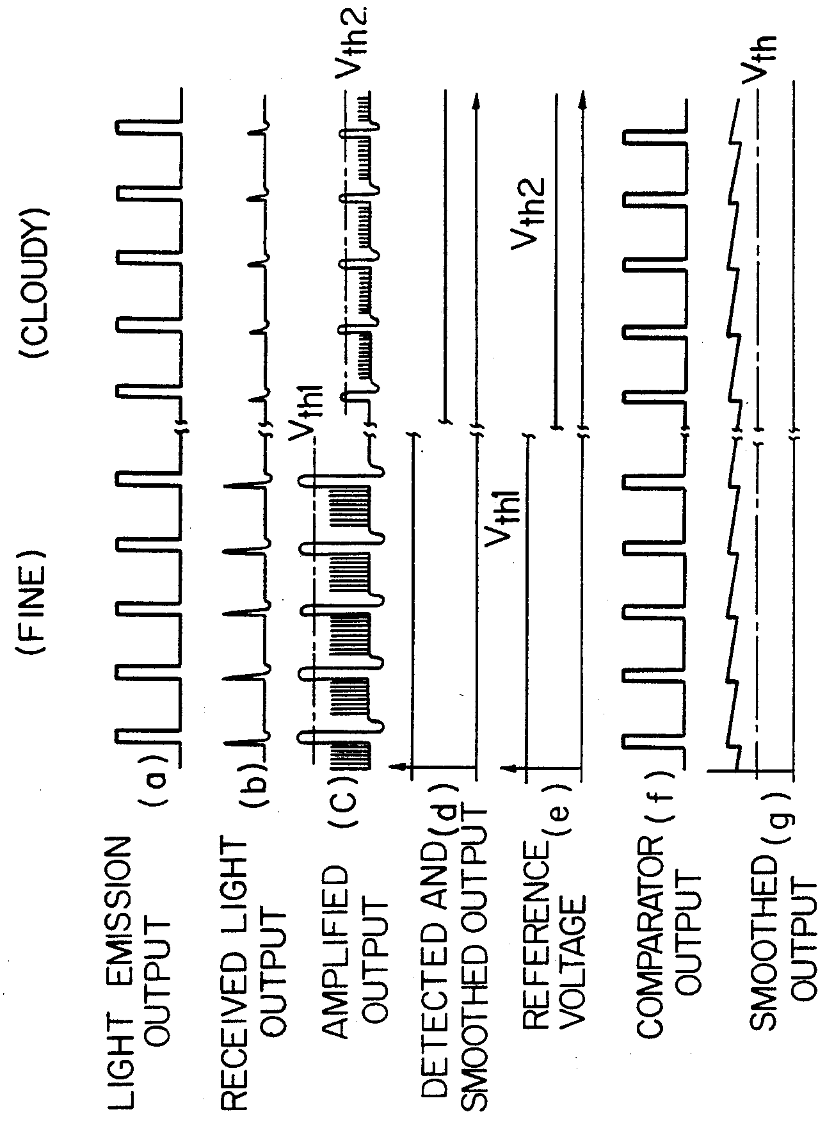
FIGS. 2(*a*)—2(*g*) show a plurality of signal waveforms useful for explaining the operation of the embodiment of FIG. 1.

Next, the operation of the embodiment of FIG. 1 will be described with reference to the signal waveforms shown in FIGS. 2(*a*)–2(*g*). The signal waveforms of FIGS. 2(*a*)–2(*g*) are classified so that the left half corresponds to fine weather wherein the attenuation of pulsed light is reduced and the right half corresponds to cloudy weather wherein the attenuation of pulsed light is increased due to the occurrence of fog or the like.

Firstly, when the weather is fine so that the attenuation of the pulsed light from the light emitting unit 101 during its propagation through space is decreased, the light sensitive element 107 generates a received light signal b of a sufficient level so that this received light signal b is amplified by the amplifier circuit 108 and then applied to the comparator 109. Also, the amplified output c of the amplifier circuit 108 is applied to the reference voltage generating circuit 116 so that a rectified and smoothed output d corresponding to the output c of the amplifier circuit 108 is generated by the rectifier circuit 117 and the smoothing circuit 118 and the rectified and smoothed output d is subjected to voltage division by a given ratio by the reference voltage setting adjuster 119, thereby generating a reference voltage e for the comparator 109.

As a result, the comparator 109 removes the noise component contained in the signal component of the output c of the amplifier circuit 108 which is lower than the voltage level $V_{th1}$ of the reference voltage e and simultaneously it generates a comparator output f reshaped into rectangular pulses corresponding to the signal component greater than the reference voltage level $V_{th1}$.

The output (pulse output) of the comparator 109 is smoothed by the smoothing circuit 111 and the resulting smoothed output g is compared with the threshold voltage $V_{th}$ from the reference voltage generating circuit 113 by the comparator 112. When the smoothed output g is greater than the threshold value $V_{th}$, the comparator 112 generates no output and this condition is a steady-state monitoring condition, thus giving no alarm. On the other hand, when the pulsed light from the light emitting unit 101 to the light receiving unit 102 is interrupted by the passage of an intruder, the smoothed output g of the smoothing circuit 111 becomes lower than the threshold voltage $V_{th}$ from the reference voltage generating circuit 113 and the comparator 112 generates an output. When the output of the comparator 112 lasts over the given time $T_2$, the switching circuit 114 comes into operation so that the output circuit 115 transmits an alarm signal to a burglary signal receiving board which in turn gives a burglary alarm.

Next, the operation of the detector in cloudy weather with the occurrence of fog or the like will be described.

When the pulsed light from the light emitting unit 101 is attenuated, during its propagation through space due to the occurrence of fog in cloudy weather, the output level of a light receiving signal b from the light sensitive element 107 is decreased and the signal level of an output c from the amplifier circuit 108 is also decreased considerably as compared with that in fine weather.

On the other hand, the noise component contained in the output c of the amplifier circuit 108 is also decreased as the result of reduction in external noise light caused by the sunlight, fluorescent lamp or the like due to the occurrence of fog and at the same time the circuit noise caused within the circuitry of the light receiving unit 102 is also relatively decreased by a decrease in the ambient temperature due to the cloudy weather. Therefore, due to the reduction in the level of the output c of the amplifier circuit 108 caused by the attenuation of the pulsed light during its propagation through space, the noise included in the output c is also decreased in like manner.

This output of the amplifier circuit 108 is applied not only to the comparator 109 but also to the reference voltage generating circuit 116 so that it is applied to the reference voltage setting adjuster 119 as a rectified and smoothed output d corresponding to the magnitude of the output c from the smoothing circuit 118 through the rectifier circuit 117. As a result, the reference voltage generated from the reference voltage setting adjuster 119 follows the reduction in the level of the output c from the amplifier circuit 108 and it is applied to the comparator 109 as a reference voltage $V_{th2}$ which is sufficiently low as compared with that in fine weather.

Thus, since the comparator reference voltage of the comparator 109 is reduced to $V_{th2}$ in response to the reduced level of the output c of the amplifier circuit 108 due to the attenuation of the pulsed light in cloudy weather, the comparator 109 undergoes setting adjustment to the proper reference voltage $V_{th2}$ with respect to the output c of the amplifier circuit 108 corresponding to the received light signal b of the reduced level so that the noise component included in the signal component lower than the reference voltage $V_{th2}$ is removed from the output c of the amplifier circuit 108 and simultaneously a rectangular pulse signal corresponding to the signal component greater than the reference voltage $V_{th2}$ is generated as a comparator output f. Thus, the smoothed output g generated from the smoothing circuit 111 smoothing the output f of the comparator 109 is substantially the same in the steady-state monitoring condition as that in fine weather so that the smoothed output g never drops below the threshold voltage $V_{th}$ from the reference voltage generating circuit 113 and the generation of any false alarm due to the occurrence of fog or the like can be prevented positively.

It is to be noted that when the reference voltage for the comparator 109 is varied in response to the output c of the amplifier circuit 108 by the reference voltage generating circuit 116, if the reference voltage is caused to decrease immediately in response to the output c upon the interruption of the pulsed light by an intruder, there is the possibility of failing to give an alarm when the noise component in the amplified received light receiving signal c exceeds the reference level. However, in this embodiment the time constant (delay time $t_1$) of the smoothing circuit 118 included in the reference voltage generating circuit 116 is in the form of a time constant exceeding the duration time (storage time $T_2$) of the switching circuit 114, with the result that upon the interruption of the pulsed light by an intruder or the like, the delay of the reference voltage in following the reduction in the received light signal level is increased sufficiently and thus there is no danger of failing to detect the interruption of the pulsed light by the intruder.

FIG. 3 is a diagram showing the relation between the received light output and the reference voltage in the embodiment of FIG. 1 during the transition from fine weather to the occurrence of fog.

FIG. 3 illustrates the proportional relation between the received light signal level and the reference voltage for the comparator 109 so that if, for example, $V_{n1}$ represents the received light output in fine weather where the transmission factor is substantially 100%, the then current reference voltage from the reference voltage setting adjuster 119 is represented by $V_{r1}$. In this condition, if the pulsed light is interrupted by an intruder, due to a rapid decrease in the received light output $V_n$, an alarm output $AL_1$ is generated after the storage time $T_2$ and then the reference voltage $V_r$ is decreased to follow up with a time delay $T_1$. In this monitoring condition, if, for example, fog occurs at a certain time $t_i$ so that the received light output $V_n$ begins to decrease, the reference voltage $V_r$ is also decreased as shown in the FIG. 3 in response to the decrease in the received light output $V_n$ after the delay time $T_1$.

Then, when the pulsed light is interrupted by the passage of an intruder so that the received light output level drops to $V_{n2}$ at time $t_n$, the reference voltage decreases to $V_{r3}$ at a time which is delayed by $T_1$ from the time that the received light output drops. Thus, since the decrease in the reference voltage involves the delay in following up, a considerable time is required for the reference voltage to attain the lower level $V_{r3}$ than the decreased received light output $V_{n2}$ so that when the received light output is $V_{n2}$, the reference voltage is still at the higher level $V_{r2}$ causing the comparator 109 to generate an output and thus after the expiration of the storage time $T_2$, an alarm signal $AL_2$ according to the interruption of the pulsed light can be generated positively.

On the other hand, when fog occurs so that the received light output is decreased gradually as shown in FIG. 3, the reference voltage practically follows up correspondingly. However, when the fog becomes denser so that a certain lower-limit received light output level $V_{n3}$ corresponding to the transmission factor of 1%, for example, is attained, the received light output level drops below the corresponding reference voltage $V_{r4}$ and thus an alarm signal $AL_3$ is generated. This is due to the fact that it is impossible to distinguish between the passage of an intruder and the occurrence of fog.

Figure 4:
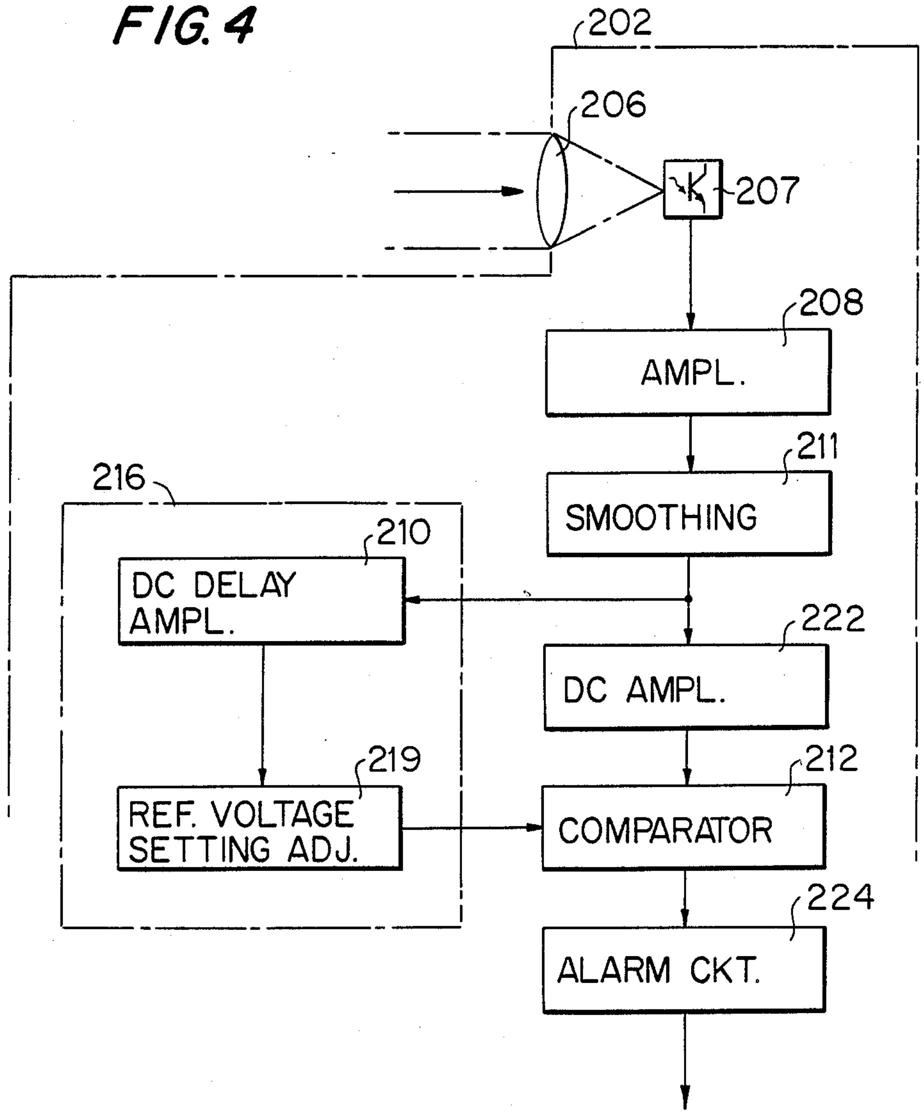
FIG. 4 is a block diagram showing a second embodiment of the invention.

FIG. 4 is a circuit block diagram showing a light receiving unit used in a second embodiment of the invention. A light receiving unit 202 receives the pulsed light comprising an infrared radiation beam from a light projecting unit (not shown) by way of a light sensitive element 207 through a condensing lens 206. An amplifier circuit 208 amplifies the received light signal from the element 207 and the output of the amplifier circuit 208 is converted to a DC level signal by a smoothing circuit 211. This DC level signal is applied, on the one hand, to a comparator circuit 212 through a DC amplifier circuit 222 and it is applied, on the other hand, to a DC delay amplifier circuit 210 in a reference voltage generating circuit 216. The DC delay amplifier circuit 210 generates a DC output which follows variations in the DC level signal from the smoothing circuit 211 with a predetermined delay $T_1$ and this DC output is divided with, for example a suitable voltage dividing ratio by a reference voltage setting adjuster 219, thereby supplying it as a reference voltage to comparator 212. As a result, the reference voltage applied to the comparator 212 from the reference voltage generating circuit 216 is varied in accordance with the output level of the amplifier circuit 208. The comparator 212 compares the reference voltage applied from the reference voltage generating circuit 216 and the DC level signal from the DC amplifier circuit 222 to generate an output when the output level of the DC amplifier circuit 222 is lower than the reference level. The output of the comparator 212 is applied to an alarm circuit 224. The alarm circuit 224 comprises, for example, the switching circuit 114 and the output circuit 115 shown in FIG. 1, so that when the output of the comparator 212 lasts over a given storage time ($T_2$), a detection signal is sent to an alarm receiving board or the like and a burglar alarm is delivered. It is to be noted that the storage time $T_2$ is determined by the specific time constant preset in the alarm circuit 224 for the purpose of preventing any false alarm due to a small animal or a leaf.

Then, the value of the time constant (storage time $T_1$) of the DC delay amplifier circuit 210 included in the reference voltage generating circuit 216 is selected longer than the storage time $T_2$ of the alarm circuit 224. Thus, when the pulsed light from the light emitting unit to the light receiving unit 202 is interrupted by an intruder, the delay time of the reference voltage in following the decrease in the output level of the amplifier circuit 208 is sufficiently large and therefore the interruption of the pulsed light by the intruder can be detected positively. On the other hand, a relatively slow decrease in the output level due to fog or the like cannot cause any false alarm since the reference voltage of the comparator circuit 212 decreases to follow it.

Figure 5:
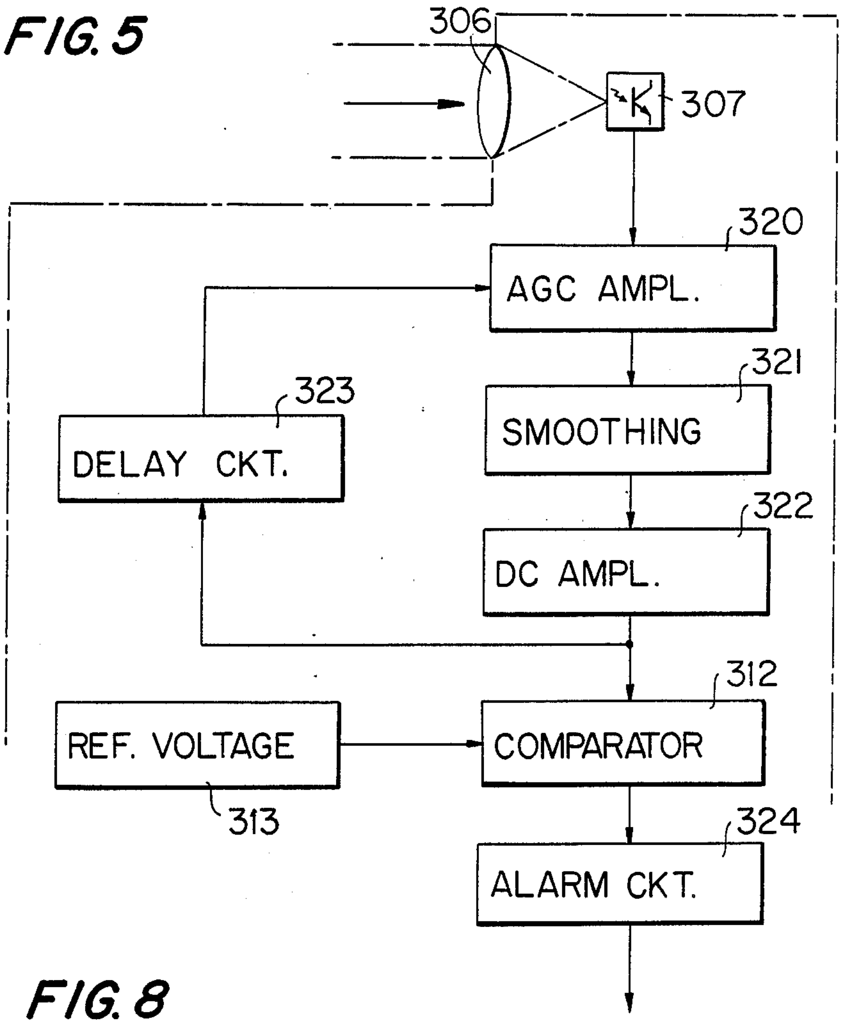
FIG. 5 is a block diagram showing a third embodiment of the invention.

FIG. 5 shows the principal construction of a light receiving unit used in a third embodiment of the invention wherein a lens 306, a light sensitive element 307, a comparator 312 and a reference voltage generating circuit 313, which are included in the light receiving unit, respectively correspond to the lens 106, the light sensitive element 107, the second comparator 112 and the reference voltage generating circuit 113 in the embodiment of FIG. 1 and therefore their detailed explanation will be omitted. Also, an alarm circuit 324 comprises, for example, the switching circuit 114 and the output circuit 115 shown in FIG. 1 so that when the output of the comparator 312 continues over a given storage time ($T_2$), a detection signal is sent to an alarm receiving board or the like and an alarm is given.

In addition, in the embodiment of FIG. 5 an AGC amplifying circuit 320, a smoothing circuit 321, a DC amplifier circuit 322 and a delay circuit 323 are arranged between the light sensitive element 307 and the comparator 312.

The AGC amplifying circuit 320 has an automatic gain control function of amplifying the received light output of the light sensitive element 307 and a gain to be controlled is determined by the AGC control voltage generated from the delay circuit 323. The smoothing circuit 321 smoothes the amplified output from the AGC amplifying circuit 320 to convert it to a DC voltage signal. The DC amplifier circuit 322 amplifies the DC voltage signal generated from the smoothing circuit and applies it to the comparator 312. Also the output of the DC amplifier circuit 322 is applied to the delay circuit 323 so that after the introduction of a given time delay, it is applied as the AGC control voltage to the AGC amplifying circuit 320.

Here, if the storage time of the alarm circuit 324 is represented by $T_2$, the delay time $T_1$ of the delay circuit 323 is set to a constant value exceeding the storage time $T_2$.

FIG. 6 shows an AGC characteristic of the AGC amplifying circuit 320 in the embodiment of FIG. 5, with the abscissa representing the transmission factor (input) of the beam of infrared radiation between the light emitting and receiving units and the ordinate representing the DC output voltage of the DC amplifier circuit 322.

In this example, the AGC characteristic of the AGC amplifying circuit 320 is a combined characteristic of $A_0$ and $A_5$ of FIG. 6. In other words, a constant DC output voltage determined by the characteristic $A_0$ is generated for the transmission factors of over 10% of the pulsed light corresponding to the received light output of the light sensitive element 107 and the characteristic $A_5$ which decreases the DC output voltage linearly with decrease in the transmission factor is set for the transmission factors of less than 10%. In this way, the AGC controlled range is set to maintain the DC output voltage constant for the transmission factors of over 10%.

In addition, the characteristic diagram of FIG. 6 also shows the cases without AGC, i.e., non-AGC characteristics $A_1$, $A_2$, $A_3$ and $A_4$ with respect to the transmission factors of 100%, 75%, 50% and 30% in the steady-state condition.

Note that in FIG. 6 the dot-and-dash line shows the alarming level determined by the reference voltage $V_r$ applied from the reference voltage generating circuit 313 to the comparator 312.

In FIG. 6, the transmission factor (the alarming transmission factor: an alarm signal is generated when decreasing to this transmission factor) and the alarming rate of change (the amount of decrease of the transmission factor required for the generation of an alarm signal) at each of the intersection points $P_1$ to $P_5$ of the alarming level $V_r$ and the non-AGC characteristics $A_1$ to $A_5$ for the transmission factors of 100%, 75%, 50%, 30% and 10%, respectively, are shown by way of example in the following Table 1.

TABLE 1

| Steady-state transmission factor | Alarming transmission factor | Alarming rate of change |
|---|---|---|
| 100% | 12% (88%) | 88% |
| 75% | 9% (91%) | 66% |
| 50% | 7% (93%) | 43% |
| 30% | 4% (96%) | 26% |
| 10% | 1% (99%) | 9% |

Note that the parentheses of alarming transmission factors indicates the rates of beam attenuation.

Next, the operation of the embodiment of FIG. 5 will be described with reference to the characteristic diagram of FIG. 6.

Now, in the condition where the transmission factor of the pulsed light between the light emitting unit and the light receiving unit is 100%, due to the AGC function of the AGC amplifying circuit 320, the DC output voltage at the intersection point $P_{01}$ of the AGC characteristic $A_0$ and the non-AGC characteristic $A_1$ for the transmission factor of 100% is generated from the DC amplifier circuit 322.

In this condition, if the transmission factor is slowly decreased to 75% due to, for example, the occurrence of fog, the operating point is moved to the intersection point $P_{02}$ of the AGC characteristic $A_0$ and the non-AGC characteristic $A_2$ for the transmission factor of 75% so that since the resulting changed transmission factor is in the AGC controlled range, the DC output voltage from the DC amplifier circuit 322 is maintained at the constant voltage according to the same AGC characteristic $A_0$.

In like manner, when the transmission factor between the two units is decreased successively to 50%, 30% and 10%, respectively, similarly the operating point is moved successively to points $P_{03}$, $P_{04}$ and $P_{05}$, respectively, so that since these points lie on the same AGC characteristic $A_0$, the DC output voltage from the DC amplifier circuit 322 is always maintained constant.

As a result, in the AGC controlled range where the transmission factor is greater than 10%, even if the transmission factor of the pulsed light is changed by the attenuation due to the occurrence of fog, the DC output voltage applied from the DC amplifier circuit 322 to the comparator 312 is always maintained at the constant level owing to the AGC amplifying function performed by the AGC amplifying circuit 320, so that when the DC output voltage is compared with the reference voltage of the constant value by the comparator 312, there is no danger of causing any false alarm even in fog or the like.

On the other hand, in the condition where the transmission factor is, for example, 100% in FIG. 6, if the pulsed light between the two units is interrupted by the passage of an intruder, the delay time $T_1$ is required, due to the delay circuit 323, for variation of the AGC control voltage applied to the AGC amplifying circuit 320 and the delay time $T_1$ is selected to be longer than the storage time $T_2$ of the alarm circuit 324. Therefore, prior to the AGC amplifying function of the AGC amplifying circuit 320 becoming effective, the DC output voltage is decreased in accordance with the non-AGC characteristic $A_1$ of FIG. 6 so that when the DC output voltage drops below the point $P_1$ intersecting the reference voltage $V_r$ preset as the alarming level in the comparator 312, the comparator 312 generates an output. The output of the comparator 312 is generated over the delay time $T_1$ introduced by the delay circuit 323 so that since the storage time $T_2$ of the alarm circuit 324 is selected to be shorter than the delay time $T_1$, prior to the generation of the amplified output according to the characteristic $A_5$ owing to the AGC amplification of the AGC amplifying circuit 320, the alarm circuit 324 generates an output and the passage of the intruder is detected positively, thereby giving an alarm.

The same operation takes place in cases where the transmission factor between the units in the steady-state monitoring condition is 75%, 50%, 30% or 10%, so that prior to the AGC function of the AGC amplifying circuit 320 becoming effective due to the delay time $T_1$ of the delay circuit 323, the DC output voltage from the DC amplifier circuit 322 is decreased in accordance with the non-AGC characteristic $A_2$, $A_3$, $A_4$ or $A_5$. Thus the comparator 312 generates an output when the DC output voltage drops below the point $P_2$, $P_3$, $P_4$ or $P_5$ intersecting the reference voltage $V_r$ establishing the alarming level. Then, when the output of the comparator 312 lasts over the storage time $T_2$ preset in the alarm circuit 324, an alarm based on the detection of the intruder is generated. Note that while, in this case, it is impossible to determine whether the alarm is due to the occurrence of fog or the passage of an intruder at the time of the point $P_5$, in any event the primary object is accomplished by the generation of the alarm.

It is to be noted here that the introduction of the delay in the AGC control has the effect that the greater the transmission factor between the units in the steady-state monitoring condition, correspondingly greater is the alarming transmission factor as shown in Table 1. For instance, while, in fine weather, the transmission factor in the steady-state monitoring condition is high, at the time the level of noise due to scattered light or the like is also high so that even if the pulsed light or the like is also high so that even if the light receiving output is not decreased sufficiently due to the noise. In this case, if no delay is introduced in the AGC control, unless the light receiving output drops to such an alarming transmission factor (about 1% at the point $P_5$) that the DC output voltage from the DC amplifier circuit 322 is decreased down to the reference voltage $V_r$ in accordance with the characteristics $A_0$ and $A_5$ of FIG. 6, the comparator 312 does not generate an output so that an alarm signal cannot be generated depending on the noise level and there is the danger of failing to given an alarm. On the contrary, in the present embodiment the delay is introduced in the AGC control so that the alarming transmission factor is shifted in level in accordance with variations of the transmission factor between the units. Thus as the transmission factor between the units in the steady-state monitoring condition is increased, the comparator 312 generates an output earlier at a higher alarming transmission factor corresponding to the point $P_2$ or $P_1$ in FIG. 6.

Note that in this case, if the reference voltage $V_r$ were decreased to follow the light receiving output without any sufficient time delay, in fine weather, for example, the noise light other than the pulsed light is so ample that a received light output of a fair level is present even if the pulsed light is interrupted and therefore an alarm cannot be generated, thus failing to give an alarm.

Figure 7:
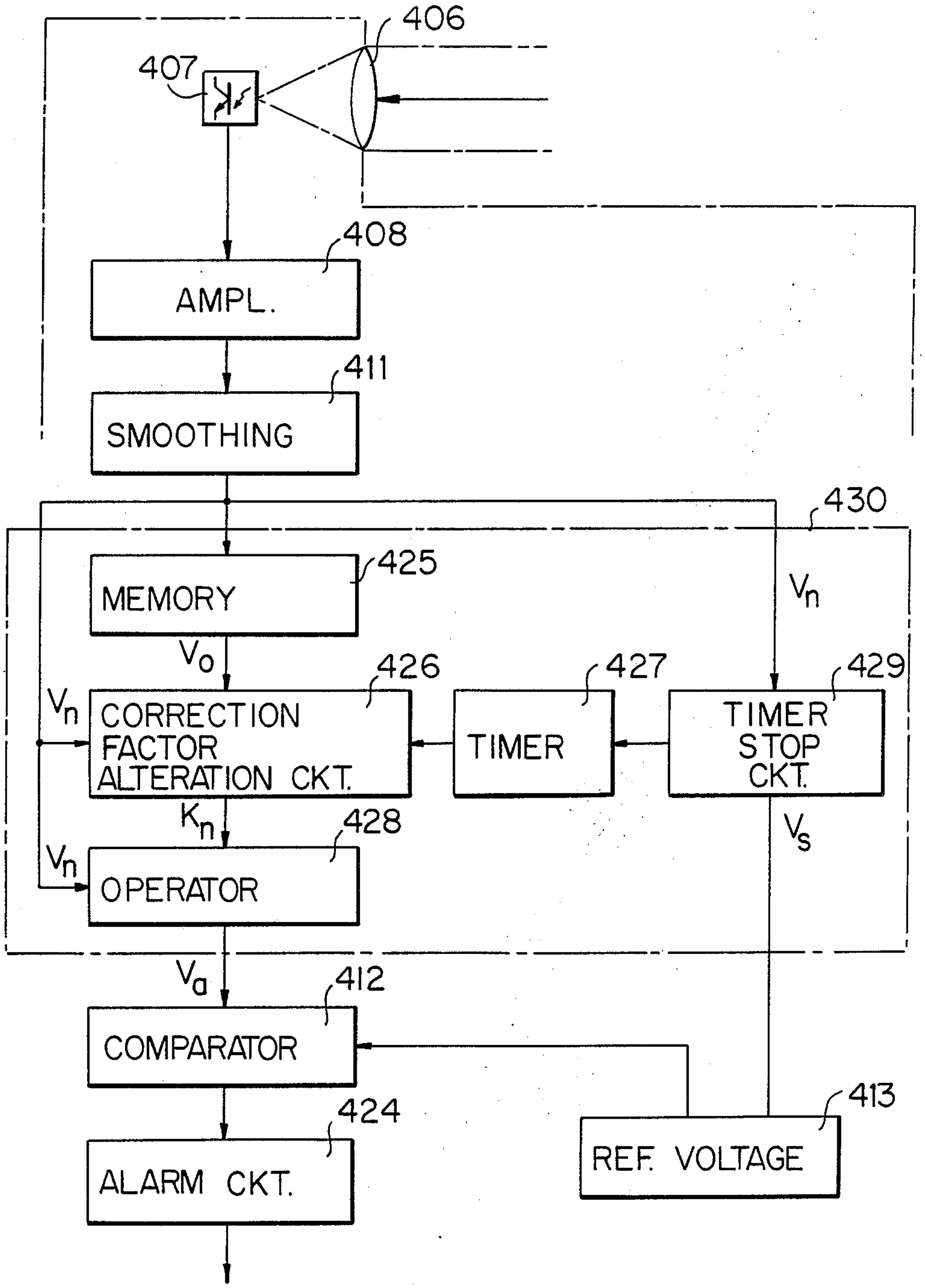
FIG. 7 is a block diagram showing a fourth embodiment of the invention.

Referring to FIG. 7, there is illustrated a circuit block diagram of a light receiving unit used in a fourth embodiment of the invention.

In FIG. 7, a lens 406, a light sensitive element 407, an amplifier circuit 408, a smoothing circuit 411, a comparator 412, a reference voltage generating circuit 413, which are included in the light receiving unit, respectively correspond to the lens 106, the light sensitive element 107, the amplifier circuit 108, the smoothing circuit 111, the second comparator 112 and the reference voltage generating circuit 113 in the embodiment of FIG. 1 and will not be described in any detail. Also, an alarm circuit 424 comprises, for example, the switching circuit 114 and the output circuit 115 shown in FIG. 1 so that when the output of the comparator 412 lasts over a given storage time ($T_2$), a detection signal is sent to an alarm receiving board or the like and a burglary alarm is issued.

In addition, in the embodiment of FIG. 7 a memory circuit 425, a correction factor alteration circuit 426, a timer 427 and an operation circuit 428 are arranged between the smoothing circuit 411 and the comparator 412.

The memory circuit 425 stores and holds as a received light initial value $V_0$ the received light output generated from the smoothing circuit 411 when the detector is connected to a power source. In other words, the memory circuit 425 stores and holds as the received light output initial value $V_0$ the received light output generated in a condition where the transmission factor is 100% with no dirt on the lens, etc. The correction factor alteration circuit 426 compares the stored initial value $V_0$ of the memory circuit 425 and the then current received light output $V_n$ generated from the smoothing circuit 411 at a given period preset by the timer 427, so that if there is a difference between the two, that is, if the then current received light output $V_n$ is decreased by the change of the transmission factor due to the occurrence of fog, a correction factor alteration function is performed to compute a new correction factor $K_n$ in accordance with the stored initial value $V_0$ and the then current light receiving output $V_n$.

In other words, when there is a difference between the stored initial value $V_0$ and the light receiving output $V_n$, the correction factor alteration circuit 426 performs the following calculation so that a new correction factor is determined and the previous correction factor is replaced with the new correction factor $$K_n=V_0/V_n$$

On the other hand, the alteration period of the correction factor alteration circuit 426 which is determined by the timer 427 is such that the alteration is effected at intervals of a given time $T_1$ which is greater than the storage time $T_2$ of the alarm circuit 424.

In accordance with the then current correction factor $K_n$ determined by the correction factor alteration circuit 426 and the received light output $V_n$ generated from the smoothing circuit 411, the operator circuit 428 performs the following correcting operation and outputs the corrected received light output to the comparator 412

$$V_a=K_n\times V_n$$

A circuit section 430, including the memory circuit 425, the correction factor alteration circuit 426, the timer 427 and the operator circuit 428, has a function of performing a correcting computation such that the received light output always follows the received light output initial value $V_0$ stored and held in the memory circuit 425 with a delay of the preset period by the timer 427 in response to decrease in the transmission factor. Note that when the level $V_n$ of the DC voltage output from the smoothing circuit 411 drops belows a limit reference voltage $V_s$ separately applied from the reference voltage generating circuit 413, the operation of the timer 427 is stopped by a timer stop circuit 429. The reason for this is that when the received light output drops below the given level, the operation of the correction factor alteration circuit 26 is stopped so that the level of the DC voltage $V_a$ applied to the comparator 412 is decreased and at any rate an alarm signal is generated, although it is not certain whether the decrease of the received light level is due to fog or an intruder.

The operation of the embodiment of FIG. 7 will now be described with reference to FIG. 8.

Figure 8:
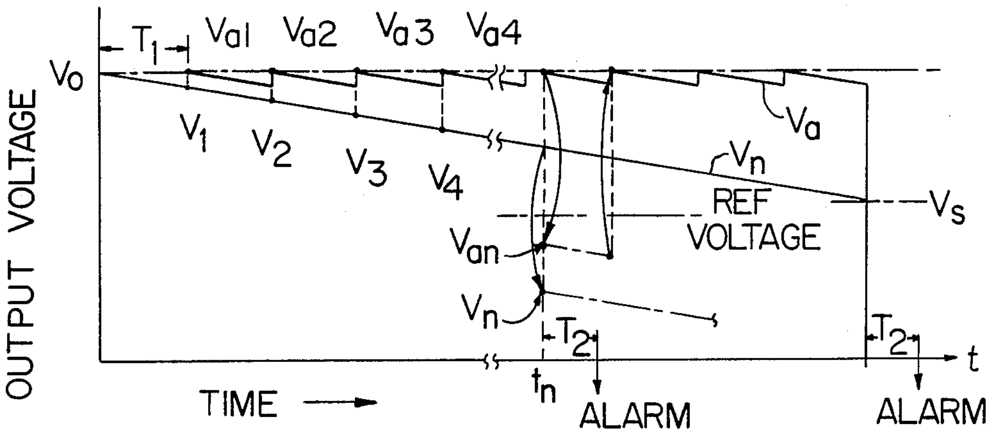
FIG. 8 is a diagram showing the correction of the light receiving output in the embodiment of FIG. 7.

FIG. 8 shows the variation of the corrected received light output generated from the operator circuit 428 in the event that the received light output is decreased linearly due to the occurrence of fog or the like.

In other words, with the light receiving initial value $V_0$ being stored and held in the memory circuit 425 upon connection to the power source, the time 427 applies a command for alteration computation to the correction factor alteration circuit 426 at the predetermined period $T_1$ so that when there is a difference between the stored initial value $V_0$ and the received light output $V_n$, a new correction factor $K_n$ is computed.

For instance, assuming that the stored initial value $V_0=100$ and the received light output $V_1=98$, the correction factor alteration circuit 426 performs the computation of $K_1=V_0+V_1=100/98=1.2$ and then the operator circuit 428 performs the computation of a corrected received light output $V_{a1}=1.02\times98=99.96$ by using the correction factor $K_1=1.02$ of the correction factor alteration circuit 426, thereby determining the corrected received light output $V_{a1}$ which is substantially equal to the stored initial value $V_0=100$.

Thereafter, each time the predetermined period $T_1$ expires, the timer 427 similarly applies a command for alteration computation to the correction factor alteration circuit 426 so that new correction factors $K_2$, $K_3$, $K_4$, . . . , are determined after thereby outputting to the comparator 412 corrected light receiving outputs $V_{a2}$, $V_{a3}$, $V_{a4}$, . . . which are practically equal to the stored initial value $V_0$.

As a result, even if the received light output is decreased by a decrease in the transmission factor due to the occurrence of fog or the like, the corrected received light output applied to the comparator 412 is maintained at substantially the constant initial value $V_0$ and the generation of a false alarm from the alarm circuit 424 is prevented positively. However, this cannot generate an alarm even if the pulsed light is completely interrupted by the fog so that the time stop circuit 429 stops the alteration of the correction factor upon the decrease to a given received light output.

On the other hand, when the pulsed light is interrupted by the passage of a person as indicated at a time $t_n$ in FIG. 8, the required corrected received light output $V_{an}$ is applied to the comparator 412 by the computation of the operator circuit 428 using the correction factor corrected just before the time $t_n$. Since this corrected received light output $V_{an}$ is the one corrected by the correction factor before the interruption of the pulsed light, it decreases considerably below the reference voltage of the comparator 412 and thus the comparator 412 applies an output to the alarm circuit 424. When this comparator output lasts so that it reaches the storage time $T_2$ of the alarm circuit 424 before reaching the next correction period, the alarm circuit 424 generates an alarm signal. In this way, even if the correction of the received light output is being effected, the passage of a person is positively detected to give an alarm.

It is to be noted that while, in the above-described embodiment, the correction factor $K_n$ is computed by the correction factor alteration circuit 426 as follows $$K_n=V_0/V_n$$

it be desirable that a limitation is set to the amount of correction effected by each correction period so that in the condition where the pulsed light is interrupted by a person, the restoration of the received light output to the stored initial value $V_0$ by correction is effected in steps. The reason for this is that if the next correction period is reached with the received light output being decreased by the interruption of the pulsed light due to the passage of an intruder as indicated at the time $t_n$ in FIG. 8, there is the danger of the decreased received light output being altered to the stored initial value $V_0$ before the expiration of the storage time $T_2$.

What is claimed is:

1. A photoelectric intrusion detector comprising:

light sensitive means for receiving a pulsed light projected from a light emitting unit at a place remote from said light emitting unit to generate a corresponding electric signal;

first comparison means for comparing said electric signal with a reference voltage to remove a noise component lower than said reference voltage from said electric signal;

circuit means for receiving an output from said first comparison means to generate an output signal having a DC level corresponding thereto;

second comparison means for comparing the DC level signal generated by said circuit means with a predetermined threshold value to generate an output when said DC level is lower than said threshsold value;

alarm signal generating means for generating an alarm output when the output of said second comparison means lasts over a predetermined storage time; and reference voltage generating means for producing a voltage output varying to follow variations of the output from said light sensitive means with a predetermined delay time exceeding the storage time of said alarm signal generating means so as to apply said voltage output to said first comparison means as said reference voltage.

2. A photoelectric intrusion detector comprising:

light sensitive means for receiving a pulsed light projected from a light emitting means at a place remote from said light emitting means to generate a corresponding electric signal;

circuit means for receiving the electric signal generated by said light sensitive means to generate an output having a DC level corresponding thereto;

comparison means for comparing the DC level signal generated by said circuit means with a reference voltage to generate an output when said DC level is lower than said reference voltage;

alarm signal generating means for generating an alarm output when the output of said comparison means lasts over a predetermined storage time; and reference voltage generating means for producing a voltage output varying to follow variations of the output from said light sensitive means with a predetermined delay time exceeding the storage time of said alarm signal generating means so as to apply said voltage output to said comparison means as said reference voltage.

3. A photoelectric intrusion detector comprising:

light sensitive means for receiving a pulsed light projected from a light emitting unit at a place remote from said light emitting unit to generate a corresponding electric signal;

automatic gain control amplifying circuit for amplifying the electric signal generated by said light sensitive means with a gain determined by an AGC control voltage;

circuit means for receiving the amplified output from said automatic gain control amplifying means to generate an output signal having a DC level corresponding thereto;

comparison means for comparing the DC level signal generated by said circuit means with a reference voltage to generate an output when said DC level is lower than said reference voltage;

alarm signal generating means for generating an alarm output when the output of said comparison means lasts over a predetermined storage time; and delay circuit means for supplying the DC level signal from said circuit means as said AGC control voltage to said automatic gain control amplifying means with predetermined delay time exceeding the storage time of said alarm signal generating means, whereby an automatic gain control is performed such that the input to said comparison means is maintained at a constant level against variations in the received light signal level of said light sensitive means with a predetermined time delay within an automatic gain control range when the received light signal level of said light sensitive means is higher than a predetermined level.

4. A photoelectric intrusion detector comprising:

light sensitive means for receiving a pulsed light projected from a light emitting unit at a place remote from said light emitting unit to generate a corresponding electric signal;

circuit means for receiving the electric signal generated by said light sensitive means to generate an output signal having a DC level corresponding thereto;

memory means for storing as an initial value a DC level signal generated by said circuit means when said detector is connected to a power source;

correction factor alteration means for comparing a value of the DC level signal generated by said circuit means with the initial value stored in said memory means at predetermined intervals to generate a correction factor output varying in correspondence to a difference therebetween;

operation means for performing an operation on the correction factor output from said correction factor alteration means and DC level signal generated by said circuit means to correct said DC level signal to follow said stored initial value with a predetermined time delay;

comparison means for comparing the corrected DC level signal generated from said operator means with a predetermined reference voltage to generate an output when the DC level of said corrected DC level signal is lower than said reference voltage; and alarm signal generating means for generating an alarm output when the output of said comparison means lasts over a predetermined storage time shorter than said predetermined interval.

* * * * *